United States Patent [19]

Adar et al.

[11] Patent Number: 5,276,746
[45] Date of Patent: Jan. 4, 1994

[54] POLARIZATION INDEPENDENT OPTICAL TAP

[75] Inventors: Renen Adar, Westfield; Charles H. Henry, Skillman; Rudolf F. Kazarinov, Martinsville, all of N.J.; Michele A. Milbrodt, Macungie, Pa.

[73] Assignee: AT&T Bell Laboratories, Murray Hill, N.J.

[21] Appl. No.: 903,690

[22] Filed: Jun. 24, 1992

[51] Int. Cl.$^5$ .............................................. G02B 6/26
[52] U.S. Cl. ........................................ 385/27; 385/39; 385/48; 385/50
[58] Field of Search .............. 385/48, 24, 27, 28, 385/142, 39, 42, 50

[56] References Cited

U.S. PATENT DOCUMENTS

| | | | |
|---|---|---|---|
| 3,558,213 | 1/1971 | Marcatili | 385/39 X |
| 5,050,180 | 9/1991 | Botez et al. | 385/39 |
| 5,108,200 | 4/1992 | Nonaka et al. | 385/50 |
| 5,133,029 | 7/1992 | Baran et al. | 385/27 |

OTHER PUBLICATIONS

C. H. Henry et al, "Glass Waveguides on Silicon for Hybrid Optical Packaging", 7 *J. Lightwave Technol.*, pp. 1530-1539 (1989).
C. H. Henry, "Recent Advances in Integrated Optics on Silicon", Fibre Optic Communications Conf. (1990).
C. H. Henry, "Integrated Optic and Hybrid Optoelectronic Devices on Silicon", OFC '91 Tutorial.
M. Kawachi, "Silica Waveguides on Silicon and Their Application to Integrated-optic Components", Optical and Quantum Electronics 22 (1990) pp. 391-416.
M. Kawauchi, "Optical Guided-Wave (Wavelength Division) Multi/Demultiplexers", JPD Translation, Jun., 1990.

*Primary Examiner*—Frank Gonzalez
*Assistant Examiner*—Stephen W. Barns
*Attorney, Agent, or Firm*—Glen E. Books

[57] ABSTRACT

In accordance with the invention an integrated optic device useful as a low level polarization independent optical tap comprises a pair of optical waveguides intersecting at an angle of 10°-25° to provide a tap signal in the range minus 20 dB to minus 60 dB. In a preferred embodiment for use in a passive repeater for undersea cable, the device comprises fiber-matching waveguides of phosphorus silicate glass on an oxide covered silicon substrate with a boron and phosphorus silicate cladding. The waveguides preferably intersect at an angle of 13°-16°. The preferred repeater further comprises a 3 dB coupler for averaging the power provided by two external pumping sources and a pair of wavelength division multiplexers for applying the pumping power to the outputs of the tap.

11 Claims, 2 Drawing Sheets

POLARIZATION INDEPENDENT OPTICAL TAP

FIELD OF THE INVENTION

This invention relates to an integrated optic device useful as a low level polarization independent optical tap. The device is particularly useful for providing a low level loop back signal in a repeater for two way optical communications systems.

BACKGROUND OF THE INVENTION

A critical application for integrated optic devices is the passive portion of repeaters for long haul fiber optic communications cable such as undersea cable contemplated for spanning the Pacific. Due to the extreme length of such cable, a large number of repeaters must be periodically located along the length of the cable to amplify and monitor signals traveling in both directions and to permit precise location of any fault in the cable.

It is contemplated that the passive portion of such a repeater will be a six terminal fiber optic device having two input terminals for receiving eastbound and westbound signals, respectively; two terminals for receiving optical pump signals; and two output terminals. The passive device must add to the eastbound signal a low level loop back signal from the westbound signal for monitoring and fault location. Similarly, it must add a loop back signal from east to west. The passive device must also introduce optical pump signals into both the eastbound and westbound fibers in order to facilitate the amplification of the signals these fibers carry. Because of the great length of the cable and the large number of repeaters which the length entails, the repeaters must perform these functions with low levels of back reflection and high levels of isolation.

Of the several functions performed by the passive repeater, one of the most demanding is tapping stable, low level loop back signals. The conventional approach to providing such signals is to pass two waveguides in close adjacency for a length dependent upon the desired degree of coupling. Energy from one core extends across the cladding to excite a diminished corresponding signal in the other core. This approach, however, does not work well when the desired degree of coupling is small. The coupled power decays exponentially with distance away from the core, rendering the core separation distance critical. For example a minus 45 dB tap typically has a core center-to-center separation of about 15 micrometers. However at such separations, the tail of the exponential field decay is both sensitive to processing of the device and dependent upon the polarization state of the signal. Accordingly, there is a need for a stable, low level optical tap which is reproducible and essentially independent of polarization.

SUMMARY OF THE INVENTION

In accordance with the invention an integrated optic device useful as a low level polarization independent optical tap comprises a pair of optical waveguides intersecting at an angle of 10°-25° to provide a tap signal in the range minus 20 dB to minus 60 dB. In a preferred embodiment for use in a passive repeater for undersea cable, the device comprises fiber-matching waveguides of phosphorus silicate glass on an oxide covered silicon substrate with a boron and phosphorus silicate cladding. The waveguides preferably intersect at an angle of 13°-16°. The preferred repeater further comprises a 3 dB coupler for averaging the power provided by two external pumping sources and a pair of wavelength division multiplexers for applying the pumping power to the outputs of the tap.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

Figure 2:
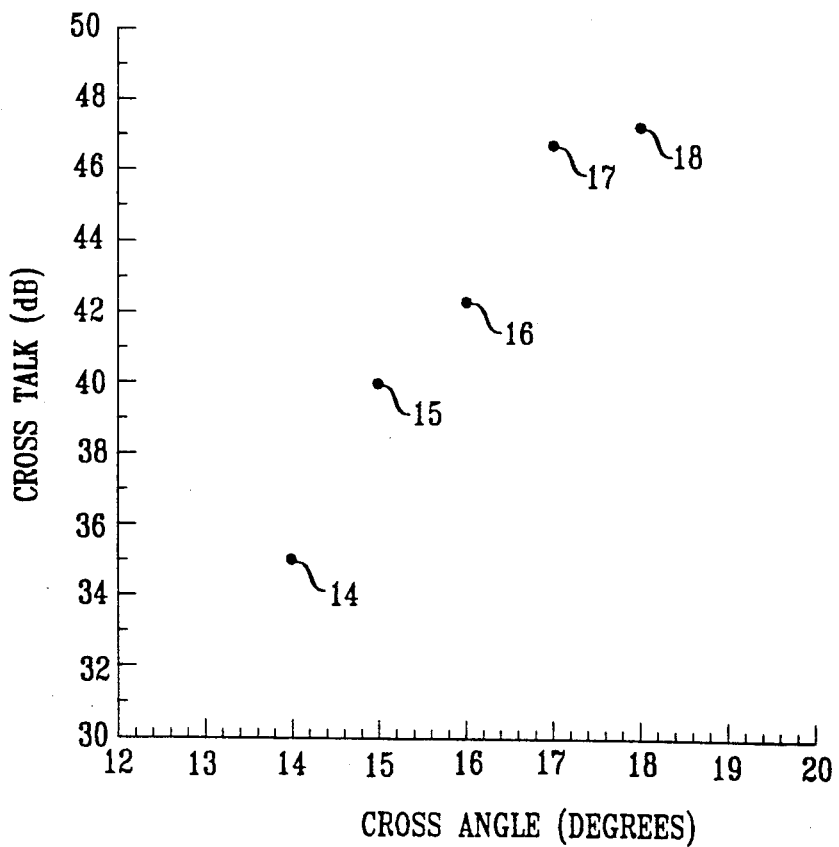
FIG. 2 is a graphical illustration showing the coupling between two intersecting waveguides as a function of the angle of intersection.

It is to be understood that these drawings are for purposes of illustrating the concepts of the invention and, except for FIG. 2, are not to scale.

DETAILED DESCRIPTION

Figure 1:
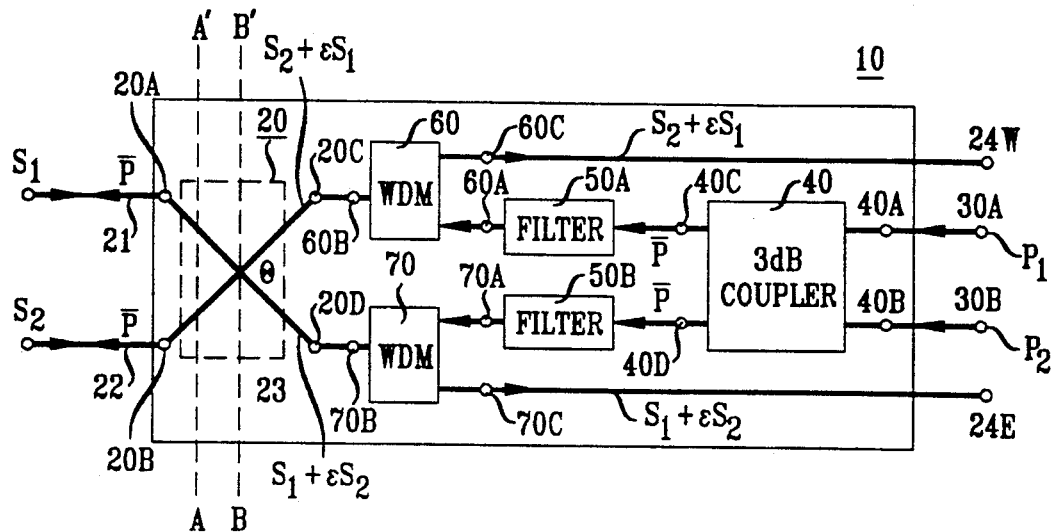
FIG. 1 is a schematic view of an integrated optic passive repeater including an optical tap in accordance with the invention.

Referring to the drawings, FIG. 1 is a schematic view of an integrated optic passive repeater 10 including a low level polarization independent tap 20 in accordance with the invention. The tap 20 comprises a pair of waveguides 21 and 22 having substantially linear portions which intersect at an angle $\theta$ between 10° and 25° and preferably between 13° and 16° at an intersection 23. If $S_1$ (which can be the eastbound signal) and $S_2$ (westbound) are the signals applied to the input terminals 20A and 20B of tap 20, then the output signals at 20D and 20C are $S_1 + \epsilon S_2$ and $S_2 + \epsilon S_1$ where $\epsilon$ is a constant much less than 1. Indeed, $\epsilon S_2$ and $\epsilon S_1$ are typically reduced minus 20 dB to minus 60 dB as compared to $S_2$ and $S_1$, respectively. The signals $\epsilon S_1$ and $\epsilon S_2$ are called loop back signals and are used in monitoring the performance of the communications system and for precise location of problems in the cable.

The advantage of using the crossed waveguide structure of tap 20 is that it provides stable loop back signals substantially independent of the polarization state of $S_1$ and $S_2$. As shown in FIG. 2 the coupling (crosstalk) between the intersecting waveguides is primarily dependent on the angle $\theta$ between the intersecting waveguides rather than spacing between adjacent guides. The angle is easier to control than spacing, the device is reproducible, and the coupling is essentially independent of polarization (less than 1.0 dB).

The remainder of the FIG. 1 passive repeater comprises a pair of pump terminals 30A and 30B for receiving a pair of optical pump signals $P_1$ and $P_2$ and providing $P_1$ and $P_2$ to the inputs 40A and 40B of a 3 dB coupler 40. Coupler 40, in turn, provides a pair of outputs $\overline{P}$ at 40C and 40D, each of which correspond to the average of $P_1$ and $P_2$. The averaged outputs $\overline{P}$ pass through respective power filters 50A and 50B for filtering out extraneous frequencies, and the filtered $\overline{P}$ outputs are applied to input terminals 60A and 70A of respective wavelength division multiplexers (WDMS) 60 and 70.

WDM 60, which can be a wavelength dependent Mach-Zehnder interferometer, receives $\overline{P}$ at input terminal 60A and $S_2 + \epsilon S_1$ at terminal 60B. It provides $\overline{P}$ at 60B and $S_2 + \epsilon S_1$ at output terminal 60C which is also the output terminal of the passive repeater. $\overline{P}$ provided at 60B travels through device 20 and through the repeater input terminal to power an external amplifier (not shown). WDM 70 similarly produces an output $S_1 + \epsilon S_2$ and projects $\overline{P}$ through 20 onto the input $S_1$.

Each of the devices 20, 40, 50A, 50B, 60 and 70 are advantageously integrated optic devices comprising fiber-matching waveguide on a substrate. $S_1$, $S_2$ can be signals of 1.56 micrometers and $P_1$, $P_2$ can be signals of 1.48 micrometers.

Figure 3:
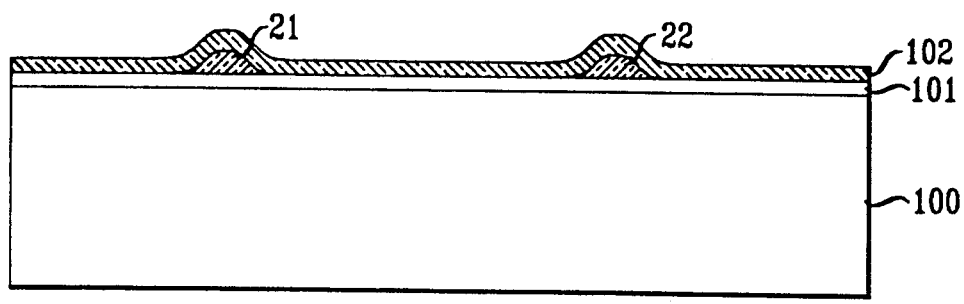
FIG. 3 is a cross section of the optical tap of FIG. 1 along the line AA'.
Figure 4:
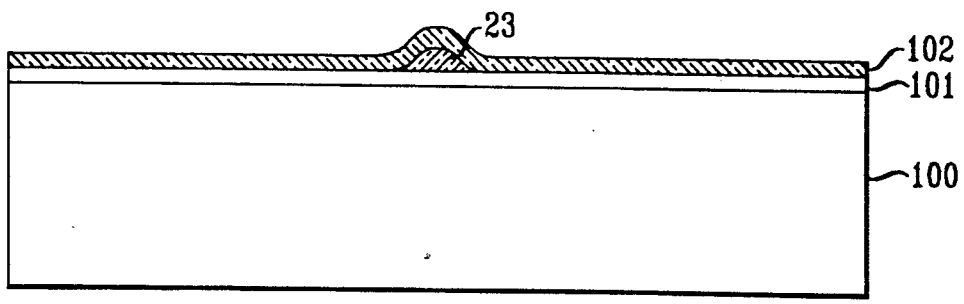
FIG. 4 is a cross section of the tap along BB'.

The preferred method for fabricating the tap 20 can be understood by reference to FIGS. 3 and 4. FIG. 3 is a cross section of the FIG. 1 device along the line AA' showing waveguide cores 21 and 22 disposed upon a substrate 100 of silicon having an oxide outer layer 101. The cores 21 and 22 are surrounded by a cladding layer 102. FIG. 4 shows the cross section along line BB'. The structure shown is advantageously fabricated as described in C. H. Henry et al, "Glass Waveguides on Silicon for Hybrid Optical Packaging, 7 *J. Lightwave Technol.*, pp. 1530-1539 (1989). In essence, silicon substrate 100 is provided with a base layer 101 of $SiO_2$ grown on the silicon by high pressure steam oxidation. A core layer of 6%-8% phosphorus doped silica having a thickness in the range 4-6 micrometers is deposited on the oxide using LPCVD, and the core layer can be dry etched as by RIE to pattern the waveguides to desired configuration. The core glass is then annealed, and thereafter a 7 micrometer layer of phosphorus and boron doped silica is deposited to act as a top cladding. Typical waveguide core widths are in the range 5-7 micrometers.

It is to be understood that the above-described embodiments are illustrative of only a few of the many possible specific embodiments which can represent applications of the principles of the invention. For example the waveguides can alternatively be formed by ion exchange into glass or can comprise diffused semiconductor waveguides or semiconductor rib waveguides. Thus numerous and varied other arrangements can be made by those skilled in the art without departing from the spirit and scope of the invention.

We claim:

1. An optical tap for providing to each of two optical waveguides a low level signal from the other comprising:

a pair of optical waveguides for carrying respective optical signals $S_1$ and $S_2$;

a region of intersection of said waveguides wherein said waveguides intersect at an angle of 10°-25° for providing output signals $S_1 + \epsilon S_2$ and $S_2 + \epsilon S_1$ wherein $\epsilon S_1$ and $\epsilon S_2$ are substantially independent of the polarization of $S_1$ and $S_2$ and are reduced by minus 20 dB to minus 60 dB from $S_1$ and $S_2$ respectively.

2. The optical tap of claim 1 wherein said waveguides intersect at an angle of 13°-16°.

3. The optical device of claim 1 wherein said waveguides comprise phosphorus silicate glass overlying a silicon substrate.

4. In an integrated optic passive repeater for a two way optical communications system of the type comprising tap means for receiving signals $S_1$ and $S_2$ and providing low level loop back signals $\epsilon S_2$ to $S_1$ $\epsilon S_1$ to $S_2$ and coupler means for providing pumping power signals for amplification of $S_1$ and $S_2$, the improvement wherein said tap means comprises a pair of optical waveguides for receiving $S_1$ and $S_2$ respectively, said waveguides intersecting at an angle $10° \leq \theta \leq 25°$ in order to provide output signals $S_2 + \epsilon S_1$ and $S_1 + \epsilon S_2$ containing loop back signals $\epsilon S_2$ and $\epsilon S_1$ respectively.

5. The device of claim 4 wherein said loop back signals $\epsilon S_1$ and $\epsilon S_2$ are minus 20 dB to minus 60 dB down from signals $S_1$ and $S_2$.

6. The device of claim 4 wherein said loop back signals $\epsilon S_1$ and $\epsilon S_2$ are independent of the polarization of $S_1$ and $S_2$.

7. The device of claim 4 wherein said coupler means comprises a 3 dB directional coupler for receiving a pair of pumping signals $P_1$ and $P_2$ and providing a pair of output signals $\overline{P}$ each equal to the average of $P_1$ and $P_2$.

8. The device of claim 4 further comprising:

a first wavelength division multiplexer means for receiving $S_2 + \epsilon S_1$ and $\overline{P}$ and for applying $\overline{P}$ to the $S_2 + \epsilon S_1$ signal;

a second wavelength division multiplexer means for receiving $S_1 + \epsilon S_2$ and $\overline{P}$ and for applying $\overline{P}$ to the $S_1 + \epsilon S_1$ signal.

9. The device of claim 8 wherein said wavelength division multiplexers are Mach-Zehnder interferometers.

10. The device of claim 4 wherein said integrated optic passive repeater comprises a silicon substrate, a layer of silicon oxide on said substrate, and a plurality of phosphorus silicate waveguides.

11. The device of claim 4 wherein $13° \leq \theta \leq 16°$.

* * * * *